US011719170B2

(12) United States Patent
Morris

(10) Patent No.: US 11,719,170 B2
(45) Date of Patent: Aug. 8, 2023

(54) METHOD FOR MONITORING ENGINE HEALTH OF AIRCRAFT

(71) Applicant: Gulfstream Aerospace Corporation, Savannah, GA (US)

(72) Inventor: Bryan Morris, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 628 days.

(21) Appl. No.: 16/791,503

(22) Filed: Feb. 14, 2020

(65) Prior Publication Data

US 2021/0254558 A1    Aug. 19, 2021

(51) Int. Cl.
| | |
|---|---|
| *F02C 9/28* | (2006.01) |
| *F01D 21/00* | (2006.01) |
| *B64D 45/00* | (2006.01) |
| *F02C 6/00* | (2006.01) |
| *G01M 15/05* | (2006.01) |
| *F02C 9/42* | (2006.01) |
| *G01M 15/14* | (2006.01) |

(52) U.S. Cl.
CPC ............... *F02C 9/28* (2013.01); *B64D 45/00* (2013.01); *F01D 21/003* (2013.01); *F02C 6/00* (2013.01); *G01M 15/05* (2013.01); *B64D 2045/0085* (2013.01); *F02C 9/42* (2013.01); *F05D 2220/323* (2013.01); *F05D 2260/80* (2013.01); *F05D 2260/821* (2013.01); *F05D 2270/051* (2013.01); *F05D 2270/13* (2013.01); *F05D 2270/303* (2013.01); *G01M 15/14* (2013.01)

(58) Field of Classification Search
CPC ............ B64D 45/00; B64D 2045/0085; F01D 21/003; F05D 2220/323; F05D 2260/80; F05D 2260/821; G01M 15/14

USPC ......................................................... 701/100
See application file for complete search history.

(56) References Cited

U.S. PATENT DOCUMENTS 6,466,858 B1 * 10/2002 Adibhatla .......... G05B 23/0254
701/100
2002/0193933 A1 * 12/2002 Adibhatla ................ F02C 9/28
701/1

(Continued)

FOREIGN PATENT DOCUMENTS

| CN | 109765058 A | * | 5/2019 | .............. G01P 13/02 |
| CN | 110276125 A | * | 9/2019 | |

(Continued)

OTHER PUBLICATIONS

Alvaro et al., "Engine Health Monitoring for Engine Fleets using Fuzzy Radviz," 2013, Publisher: IEEE.*

(Continued)

*Primary Examiner* — Tuan C To
(74) *Attorney, Agent, or Firm* — Lorenz & Kopf, LLP | LKGlobal

(57) ABSTRACT

Methods for monitoring engine health of an aircraft having a first engine and a second engine are provided. In one example, the method includes obtaining a first turbine gas temperature of the first engine and a second engine turbine gas temperature of the second engine from a first flight. The first turbine gas temperature and the second turbine gas temperature are related to each other to define a first value. The first value is compared to a data set for monitoring the engine health.

17 Claims, 5 Drawing Sheets

(56) References Cited

U.S. PATENT DOCUMENTS

| | | | |
|---|---|---|---|
| 2006/0047512 A1* | 3/2006 | Yuan | G05B 17/02 |
| | | | 704/244 |
| 2006/0212281 A1* | 9/2006 | Mathews, Jr. | G06F 30/15 |
| | | | 703/7 |
| 2007/0012044 A1* | 1/2007 | Osborn | G05B 23/0232 |
| | | | 60/803 |
| 2010/0138132 A1* | 6/2010 | Apps | G07C 3/08 |
| | | | 701/100 |
| 2010/0161196 A1* | 6/2010 | Goericke | G05B 23/0243 |
| | | | 701/99 |
| 2014/0222310 A1* | 8/2014 | Volponi | F02C 9/00 |
| | | | 701/101 |
| 2014/0309846 A1 | 10/2014 | Howard | |
| 2018/0022465 A1* | 1/2018 | Gelwan | F02C 9/00 |
| | | | 60/778 |
| 2018/0038284 A1* | 2/2018 | Patry | F02C 9/00 |
| 2018/0164796 A1* | 6/2018 | Garciamoreno | F01D 21/003 |
| 2018/0297718 A1* | 10/2018 | Adibhatla | G07C 5/006 |
| 2018/0370651 A1* | 12/2018 | Miller | B64D 27/12 |
| 2019/0002113 A1* | 1/2019 | Gansler | B64D 35/08 |
| 2019/0277155 A1* | 9/2019 | Dowdell | F01D 21/003 |
| 2019/0367190 A1* | 12/2019 | Bewlay | B64F 5/60 |
| 2019/0376408 A1* | 12/2019 | Adibhatla | F01D 17/06 |
| 2020/0248622 A1* | 8/2020 | Crowley | F02C 7/057 |
| 2020/0256265 A1* | 8/2020 | Manoukian | F02C 9/42 |
| 2020/0408106 A1* | 12/2020 | Karnofski | F01D 23/00 |
| 2021/0108571 A1* | 4/2021 | Manoukian | F02C 9/16 |
| 2021/0140338 A1* | 5/2021 | Girard | F01D 17/08 |
| 2021/0179294 A1* | 6/2021 | Drolet | F02C 9/00 |

FOREIGN PATENT DOCUMENTS

| | | | | |
|---|---|---|---|---|
| CN | 110567722 A | * | 12/2019 | |
| CN | 110582626 A | * | 12/2019 | F02C 7/00 |
| EP | 2202147 A1 | * | 6/2010 | F01D 21/003 |
| EP | 3418504 A1 | * | 12/2018 | B60L 3/12 |
| WO | WO-2006026340 A1 | * | 3/2006 | G05B 17/02 |
| WO | 2008152346 A1 | | 12/2008 | |
| WO | WO-2008152346 A1 | * | 12/2008 | G07C 3/08 |
| WO | 2014059000 A1 | | 4/2014 | |

OTHER PUBLICATIONS

Hai et al., "Evaluation of Filtering Techniques for Aircraft Engine Condition Monitoring and Diagnostics," 2008, Publisher: IEEE.*

* cited by examiner

METHOD FOR MONITORING ENGINE HEALTH OF AIRCRAFT

TECHNICAL FIELD

The technical field relates generally to engines, and more particularly, relates to a method for monitoring engine health of a multiple engine aircraft.

BACKGROUND

Engines such as gas turbines are used to produce thrust for vehicles such as aircraft. It is important to monitor engine health over course of use in order to troubleshoot potential damage and/or changes in engine performance. The ability to accurately monitor engine health helps extend the overall lifespan of the engine and improve its efficiency. Engine health can be determined by monitoring the engine's parameters. By monitoring the changes in the engine's parameters over the course of the engine's life, potential engine health issues and/or engine damage can be efficiently and effectively attended to and/or altogether avoided.

Current methods for monitoring engine health for aircraft include observing an engine parameter(s) such as turbine gas temperature (TGT) and monitoring how the parameter(s) changes over course of use for that engine. In one example, data corresponding to TGT of an engine is obtained for several flights. The data may be normalized in an attempt to correct for various conditions. This data is then trended chronologically to determine if there are any changes in TGT. A sudden increase or decrease in TGT may, for example, indicate a change in engine health. Unfortunately, even with attempting to correct for various conditions, external factors resulting in flight-to-flight variations such as engine idle time or the like produce significant noise in the trended data that make it difficult to accurately determine engine health.

Accordingly, it is desirable to provide methods for monitoring engine health of an aircraft having multiple engines for addressing one or more of the foregoing issues. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a method for monitoring engine health of an aircraft having a first engine and a second engine are provided herein.

In a first non-limiting embodiment, the method includes, but is not limited to, obtaining a first turbine gas temperature of the first engine and a second engine turbine gas temperature of the second engine from a first flight. The method further includes, but is not limited to, relating the first turbine gas temperature and the second turbine gas temperature to each other to define a first value. The method further includes, but is not limited to, comparing the first value to a data set for monitoring the engine health.

In another non-limiting embodiment, the method includes, but is not limited to, obtaining a first turbine gas temperature of the first engine and a second turbine gas temperature of the second engine from a first flight. The method further includes, but is not limited to, obtaining a third turbine gas temperature of the first engine and a fourth turbine gas temperature of the second engine from a second flight. The method further includes, but is not limited to, relating the first turbine gas temperature and the second turbine gas temperature to each other to define a first value. The method further includes, but is not limited to, relating the third turbine gas temperature and the fourth turbine gas temperature to each other to define a second value. The method further includes, but is not limited to, comparing the first value and the second value to monitor the engine health.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to methods for monitoring engine health of an aircraft having a first engine and a second engine. The exemplary embodiments taught herein provide obtaining a first turbine gas temperature of the first engine and a second turbine gas temperature of the second engine from a first flight. In an exemplary embodiment, the first turbine gas temperature and the second turbine gas temperature are obtained during take-off of the aircraft from a runway. Advantageously, this provides a consistent engine state for obtaining the first turbine gas temperature and the second turbine gas temperature. In an exemplary embodiment, the first turbine gas temperature and the second turbine gas temperature are obtained at a first set of ambient conditions.

The first turbine gas temperature and the second turbine gas temperature are related to each other to define a first value. In an exemplary embodiment, relating the first and second turbine gas temperatures includes using the first set of ambient conditions to standardize the first turbine gas temperature and the second turbine gas temperature to define a first standardized turbine gas temperature and a second standardized turbine gas temperature, respectively. Next, a difference between the first standardized turbine gas temperature and the second standardized turbine gas temperature is determined to define the first value. The first value is compared to a data set for monitoring the engine health.

In an exemplary embodiment, advantageously, by relating the first turbine gas temperature and the second turbine gas temperature to each other to define a first value and comparing the first value to a data set, flight-to-flight variations in operating and/or ambient conditions are reduced and engine health can be monitored more accurately and effectively. Without being limited by theory, it is believed that this is because the first engine and the second engine are usually operated in a similar fashion prior to take-off, and thus the impact of each engine's operating conditions on turbine gas temperature is experienced substantially similarly by all of the aircraft's engines.

Figure 1:
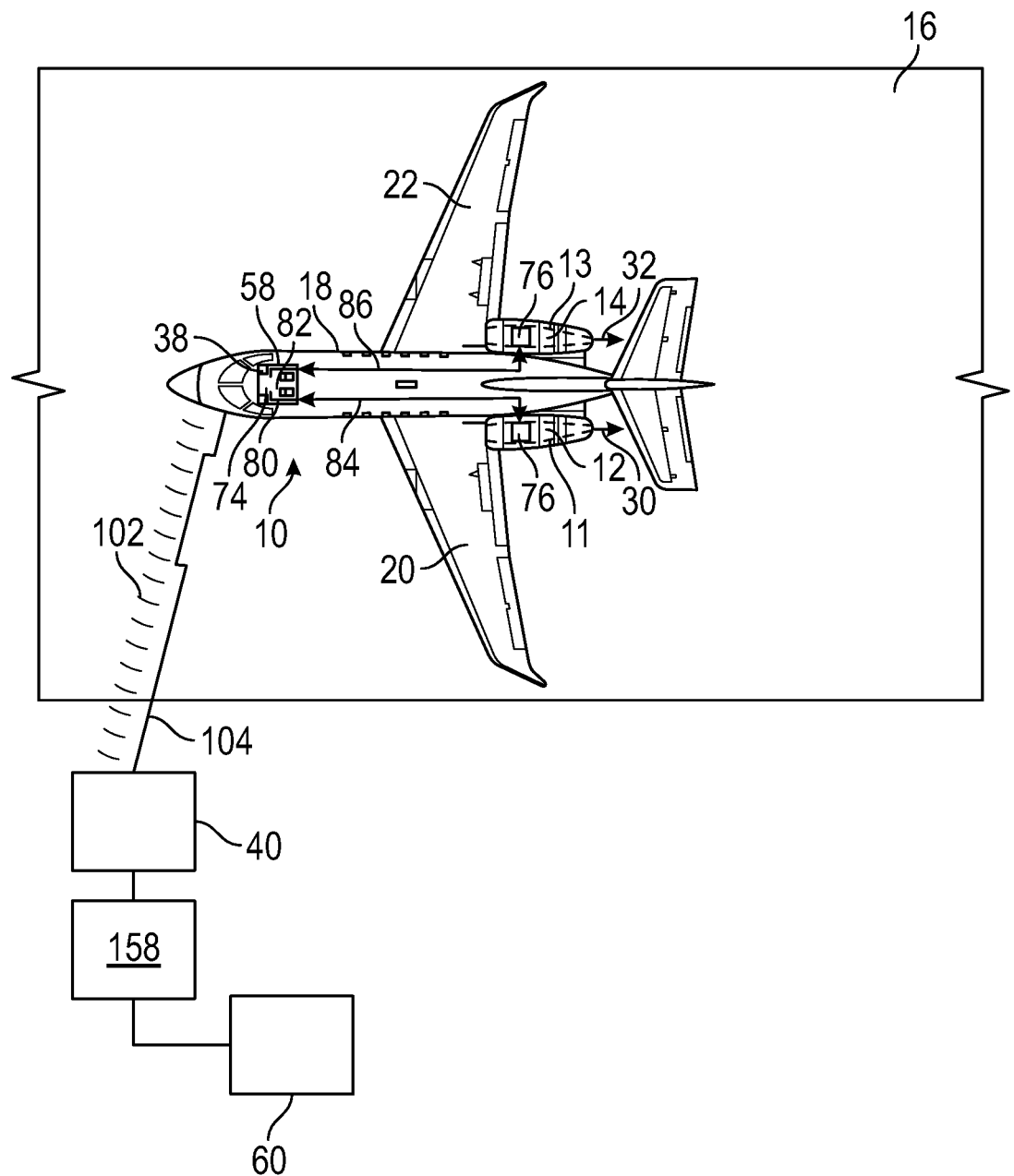
FIG. 1 illustrates a top view of an aircraft having multiple engines and disposed on a runway in accordance with an exemplary embodiment.
Figure 2:
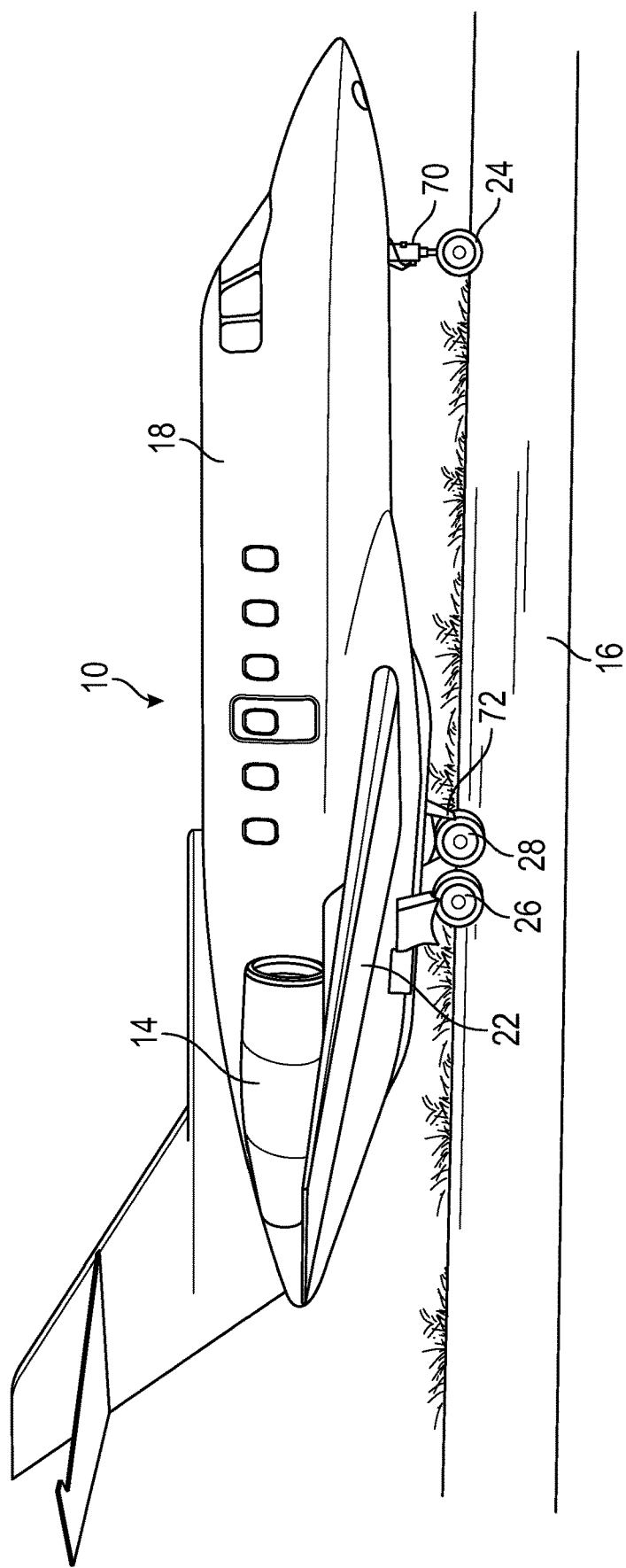
FIG. 2 illustrates a perspective side view of an aircraft having multiple engines and disposed on the runway in accordance with an exemplary embodiment.

FIGS. 1-2 illustrate a top view and a perspective view of an aircraft 10 that includes propulsion systems 11 and 13 that each include an engine 12, 14 in accordance with an exemplary embodiment. As illustrated, the aircraft 10 is disposed on a runway 16. Although the aircraft 10 is illustrated as having two engines 12 and 14, it is to be understood that various alternate embodiments of the aircraft 10 may include the aircraft 10 having more than two engines and/or more than two propulsion systems. The aircraft 10 includes a fuselage 18 as the main body of the aircraft 10 that supports wings 20 and 22. Depending on the design of the aircraft 10, the engines 12 and 14 may be attached to the fuselage 14, or alternatively, to the wings 20 and 22. Landing gears 70 and 72 include a nose landing gear 70 with a wheel(s) 24 disposed under a nose section of the fuselage 18 and main landing gears 72 with wheels 26 and 28 disposed under the wings 20 and 22, respectively, of the aircraft 10.

As illustrated, the engines 12 and 14 are gas turbine engines. In some embodiments, the gas turbine engines may comprise turbojet engines or the like. In an exemplary embodiment, a turbojet engine operates by compressing air with an inlet fan and compressor blades that are rotating at operating speeds. Fuel is then mixed with the compressed air. The mixture of fuel and compressed air then moves into the turbojet's combustion chamber where it is ignited, increasing both its temperature and pressure. The hot, high-pressure mixture of air and combustion gases is then passed over a turbine (which drives the compressor blades) and then exits the turbojet engine. After exiting the turbojet engine, the high temperature, high pressure mixture is exhausted by the propulsion system through a nozzle at an aft end of the propulsion system to produce both thrust and a plume of exhaust gas (indicated by single headed arrows 30 and 32).

The aircraft 10 includes an electronic system 58. The electronic system 58 includes various control systems and devices including a flight management system, a memory storage device(s) 38, an engine electronic controller system 74, and other systems that include one or more processors such as a general purpose processor, a content addressable memory, a digital signal processor, an application specific integrated circuit, a field programmable gate array, any suitable programmable logic device, discrete gate or transistor logic, discrete hardware components, or any combination designed to perform various aircraft functions. Moreover, the various systems of the electronic system 58 may include one or more displays that are in communication with a processor. The display may be any one of numerous known displays suitable for rendering textual, graphic, and/or iconic information in a format viewable by the pilot, crew member, and/or any other person authorized for such viewing. Further, the various systems of the electronic system 58 may be in communication with one or more of the other systems or operate autonomously from the other systems.

In an exemplary embodiment, the engine electronic controller system 49 includes a pair of engine electronic controllers 76, each engine electronic controller 76 being in communication with a respective engine 12 or 14. A throttle quadrant assembly (TQA) 80 and/or auto thrust controller 82 is in communication with the engine electronic controllers 76 to provide engine thrust commands 84 and 86, respectively.

Figure 7:
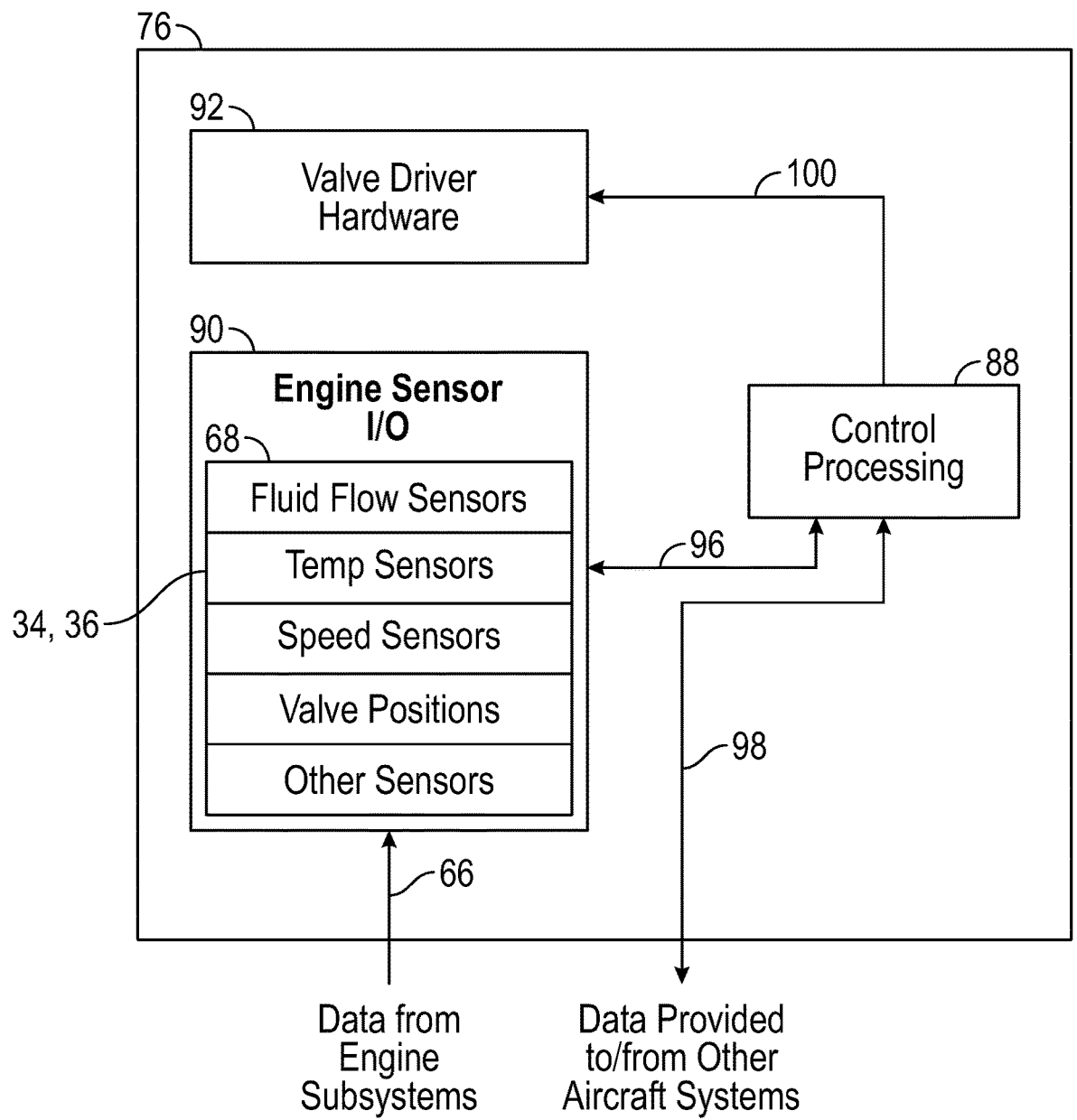
FIG. 7 illustrates a block diagram of an engine electronic control unit in accordance with an exemplary embodiment.

FIG. 7 illustrates an exemplary embodiment of an engine electronic controller 76 compatible for use with engines 12 and 14. Engine electronic controller 76 includes blocks for performing Engine Electronic Controller (EEC) functions. The engine electronic controller 76 includes, for example, a processor 88, an engine sensor input-output interface 90, engine valve driver hardware 92. The processor 88, the engine sensor input-output interface 90, the engine valve driver hardware 92 are used in performing the EEC functions.

The engine sensor input-output interface 92 receives data 66 from various engine sub-systems (not illustrated), and provides it to the various sensors 68 that may include, for example fluid flow sensors, temperature sensors, speed sensors, valve position sensors, etc. As will be discussed in further detail below, the temperature sensors include a first sensor 34 associated with the engine 12 and a second sensor 36 associated with the engine 14. The sensors 68 generate sensor data output signals 96 that are provided to the processor 88.

As part of the EEC functions, the processor 88 processes data 98 provided from various aircraft systems (e.g., including engine thrust commands 84 and 86 from the throttle quadrant assembly (TQA) 80 and/or the auto thrust controller 82) and the sensor data output signals 96 to generate engine valve control signals 100 that are provided to the engine valve driver hardware 92 to control the corresponding engine 12, 14 of the aircraft 10. The processor 88 also provides data 98 to other aircraft systems including for example turbine gas temperature (TGT) of the engines 12, 14 to the electronic system 58 as will be described in further detail below.

In particular and with reference to FIGS. 1 and 7, each of the engines 12, 14 includes the corresponding sensor 34, 36 that measures the turbine gas temperature (TGT) of the engine 12, 14. In an exemplary embodiment, the TGT of the engine 12, 14 is the temperature of the exhaust gas stream 30, 32 for that engine 12, 14, respectively. The sensors 34 and 36 are, for example, thermocouples or the like. In an exemplary embodiment, the aircraft 10 includes the memory storage device 38 that receives data corresponding to the TGTs from the sensors 34 and 36, respectively.

The TGTs of the engines 12 and 14 are obtained from and/or during a flight (also referred to herein as "first flight"). As used herein, the term "flight" refers to any time from embarking to disembarking including taxi, take-off, mid-flight, and landing in which at least one of the engines 12 and 14 is running. In an exemplary embodiment, the TGTs are obtained from the flight at a set of ambient conditions. The set of ambient conditions includes, for example, an ambient temperature and rotor speeds of the engines 12 and 14. The ambient conditions refer to the conditions that are related to and/or impacted by the atmosphere surrounding the aircraft 10 at the time in which the TGTs are obtained. For example, the rotor speed of the engines 12 and 14 are impacted by the altitude at which the aircraft 10 takes off from the runway 16. In an exemplary embodiment, the memory storage device 38 receives the data corresponding to the ambient conditions.

In an exemplary embodiment, the TGTs are obtained from the flight at about take-off of the aircraft 10 from the runway 16. As used herein, the term "take-off" refers to the time at which the wheels 26 and 28 leave the runway 16 and/or the aircraft begins to ascend. As used herein, the term "about" is to be understood to encompass practical limits or tolerances for performing the specified task or event. In an exemplary embodiment, the set of ambient conditions are obtained from the flight at about or during take-off of the aircraft 10 from the runway 16.

In an exemplary embodiment, obtaining the TGTs includes extracting data corresponding to the TGTs and the ambient conditions from the memory storage device 38 to an external memory storage device 40. For example, the external memory storage device 40 may be located at the airport, remote facility, or the like and include one or more processors such as a general purpose processor, a content addressable memory, a digital signal processor, an application specific integrated circuit, a field programmable gate array, any suitable programmable logic device, discrete gate or transistor logic, discrete hardware components, or any combination designed to perform various memory storage functions. The TGTs may be wirelessly communicated via path 102, or alternatively, a communication pathway 104 that can be removably coupled to the aircraft, for example when the aircraft 10 is docked at the airport after a flight.

The TGTs are related to each other to define a value. In an exemplary embodiment, relating TGTs is performed by an electronic system 158. The electronic system 158 is in communication with the external memory storage device 40 and includes one or more processors that is operative to use an algorithm to relate, compare, evaluate, and/or analyze the data. In an exemplary embodiment, relating the TGTs to each other includes using the set of ambient conditions to standardize the TGTs to define standardized TGTs. For example, the TGT of the engine 12 is standardized using the ambient temperature and the rotor speed of engine 12 and the TGT of the engine 14 is standardized using the ambient temperature and the rotor speed of engine 14. This standardization includes mathematically adjusting the TGTs to what they would have been if they were calculated at a "standard temperature" (e.g., standard temperature of 273.15K) and a "standard rotor speed" (e.g., rotor speed at standard temperature of 273.15K and standard pressure of 1 atm).

In an exemplary embodiment, the process of relating the TGTs to each other further includes taking a difference of the standardized TGTs to define the value. As used herein, the term "difference" refers to a mathematical difference between values. For example, taking a difference of 50 and 52 is 50−52=−2, or, alternatively 52−50=2.

In an exemplary embodiment, the process described above of obtaining and relating TGTs of the engines 12 and 14 is repeated for a plurality of flights, with each flight having its own set of ambient conditions. For example, TGTs of the engines 12 and 14 are obtained from another flight (also referred to herein as "second flight") at a set of ambient conditions. The TGTs of the second flight are related to each other to define a value. This includes using the set of ambient conditions from the second flight to standardize the TGTs and taking a difference of the standardized TGTs to define the corresponding value.

Figure 3:
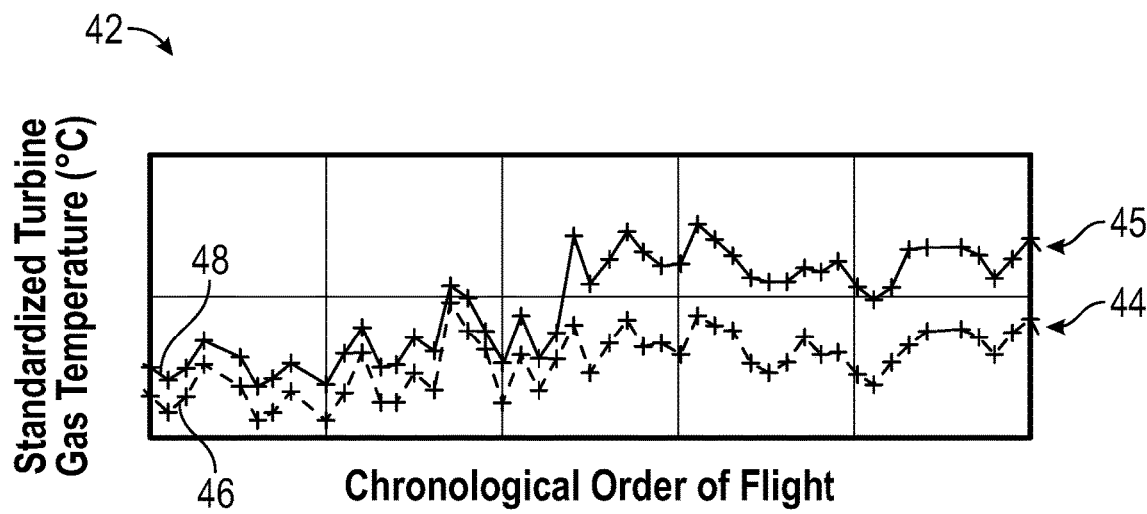
FIG. 3 illustrates a data set of standardized turbine gas temperatures of multiple engines in accordance with an exemplary embodiment.

Referring to FIGS. 1 and 3, a data set 42 of standardized turbine gas temperatures for the engines 12 and 14 in accordance with an exemplary embodiment is shown. The data set 42 includes a plurality of values 44 and 45. Each value 44, 45 corresponds to a TGT obtained from one of the engines 12 or 14 from a specific flight at the set of ambient conditions for that flight. For example, line 46 includes standardized TGTs for the engine 12 from a plurality of flights in chronological order of flight. Similarly, line 48 includes standardized TGTs for the engine 14 from the same plurality of flights in chronological order of flight. As such, the plurality of values 44 and 45 represent the standardized TGTs obtained and related by the process described above for both engines 12 and 14, respectively, from a plurality of flights, with each flight having its own set of ambient conditions.

Figure 4:
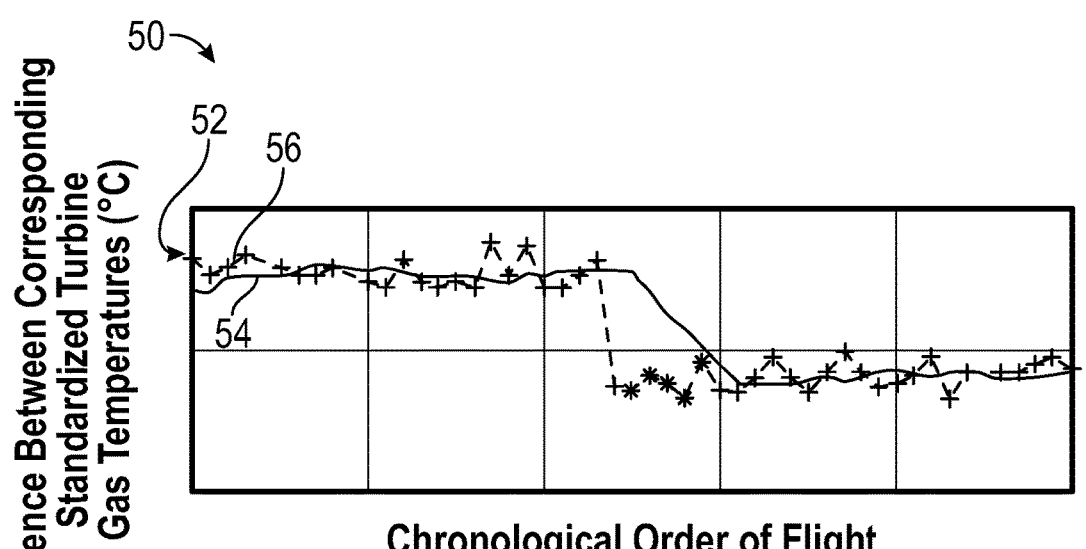
FIG. 4 illustrates a data set of a plurality of values and a shifted, moving average associated with turbine gas temperatures of multiple engines in accordance with an exemplary embodiment.

Referring also to FIG. 4, a data set 50 of a plurality of values 52 and a shifted, moving average 54 in accordance with an exemplary embodiment is shown. The plurality of values 52 correspond to the plurality of values 44 and 45. This means that each of the values in the plurality of values 52 is defined by taking the difference between the standardized TGTs of the engines 12 and 14 for each of the flights in the plurality of flights. Line 56 includes the plurality of values 52 in chronological order of flight.

The plurality of values 52 are compared for monitoring engine health of the engines 12 and 14. In an exemplary embodiment, comparing is performed by the electronic system 158.

In an exemplary embodiment, comparing includes statistically analyzing at least two values in the plurality of values 52. As used herein, the phrase "statistically analyzing" includes using one or more statistical methods to analyze the values being compared. In an exemplary embodiment, the process of statistically analyzing includes comparing the value from the most-recent flight to the other values in the plurality of values 52 of the data set 50. At least one of the values from previous flights is used to produce an average, and the value from the most-recent flight is mathematically compared to the average. For example, if the three most-recent values in chronological order of flight are "5", "5", and "8", the average of (5+5+8)/3=6 is mathematically compared to the value from the most-recent flight, which is 8.

In an exemplary embodiment, the average is a moving average. For example, if the three most-recent values in chronological order of flight are "5", "5", and "8", a 2-point moving average is (5+8)/2=6.5. This is mathematically compared to the value from the most-recent flight, which is 8. If another value is collected and the four most-recent values in chronological order of flight are "5", "5", "8" and "8", a 2-point moving average is (8+8)/2=8. This is mathematically compared to the value from the most-recent flight, which is 8. As such, a moving average "moves" to more-recent values as values from new flights arrive in the data set 50. A 3-point moving average is an average of 3 values, a 4-point moving average is an average of 4 values, and so on. In an exemplary embodiment, the average has a 7-point moving average.

In an exemplary embodiment, the average is a shifted, moving average. For example, if the four most-recent values in chronological order of flight are "5", "5", "8" and "8", a 2-point moving average with a 2-point shift is (5+5)/2=5. This is mathematically compared to the value from the most-recent flight, which is 8. The shift controls how recent the values are that are used in the average. A 2-point moving average with no shift, for example, would be an average of the values from the two most-recent flights. Essentially, a shift pushes the calculation for the average back to less-recent data. In an exemplary embodiment, the average has a 2-point shift.

In an exemplary embodiment, mathematically comparing includes taking a difference between the value from the most-recent flight and the average to define a deviation. In an exemplary embodiment, the deviation is a moving deviation sum. For example, if the five most-recent values in chronological order of flight are "5", "3", "7", "10", "10", and a 3-point moving average with a 2-point shift is (5+3+7)/3=5, then a 3-point moving deviation sum is (7−5)+(10−5)+(10−5)=12. In an exemplary embodiment, the deviation is converted into sigma units. For example, a standard deviation is used to convert the deviation into sigma units. If the five most-recent values in chronological order of flight are "5", "3", "7", "10", "10" and the standard deviation (sigma) for the standardized TGTs of the engine is 2, then a 3-point moving average with a 2-point shift is (5+3+7)/3=5 and a 3-point moving deviation sum is (7−5)+(10−5)+(10−5)=12=12/2 sigma units=6 sigma units. In an exemplary embodiment, the deviation is a 4-point moving deviation sum.

In an exemplary embodiment, comparing includes comparing the deviation to a threshold value. For example, if the value of the deviation is greater than the threshold value, this predicts that there is an issue with engine health. If the value of the deviation is less than the threshold values, this predicts that there is not an issue with engine health. In an exemplary embodiment, the threshold value is 8 sigma units. In an exemplary embodiment, a communication relating to engine health is sent from the electronic system 158 to a user interface 60 in response to comparing the deviation to the threshold value. For example, an "alert", "warning", or "notice" is sent from the electronic system 158 to the user interface 60 in response to the value of the deviation being greater than the threshold value.

Figure 5:
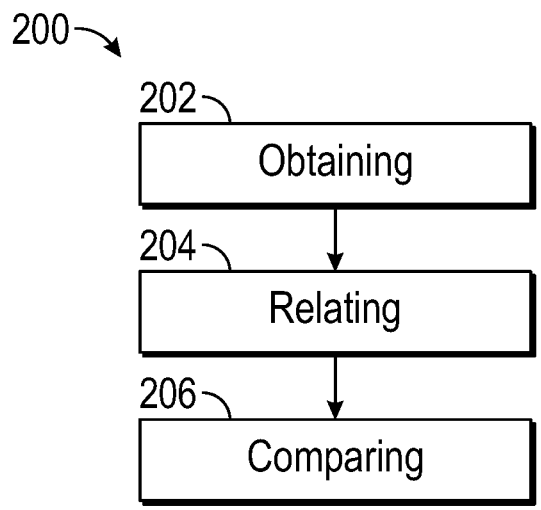
FIG. 5 illustrates a block diagram for a method for monitoring engine health of an aircraft having a first engine and a second engine in accordance with an exemplary embodiment.

Referring to FIG. 5, a method 200 for monitoring engine health of an aircraft having a first engine and a second engine in accordance with an exemplary embodiment is provided. The method 200 includes obtaining (STEP 202) a first turbine gas temperature of the first engine and a second turbine gas temperature of the second engine from a first flight. The first turbine gas temperature and the second turbine gas temperature are related (STEP 204) to each other to define a first value. The first value is compared (STEP 206) to a data set for monitoring engine health.

Figure 6:
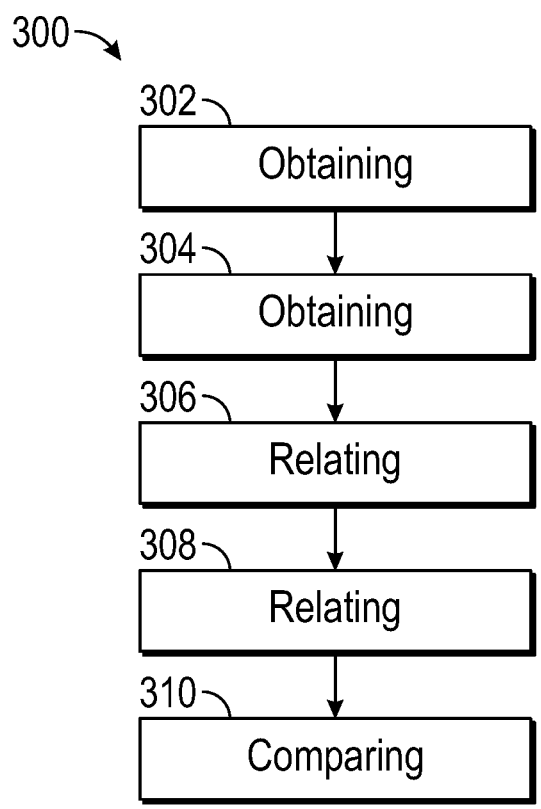
FIG. 6 illustrates a block diagram for a method for monitoring engine health of an aircraft having a first engine and a second engine in accordance with an exemplary embodiment.

Referring to FIG. 6, a method 300 for monitoring engine health of an aircraft having a first engine and a second engine in accordance with an exemplary embodiment is provided. The method 300 includes obtaining (STEP 302) a first turbine gas temperature of the first engine and a second turbine gas temperature of the second engine form a first flight. A third turbine gas temperature of the first engine and a fourth turbine gas temperature of the second engine from a second flight is obtained (STEP 304). The first turbine gas temperature and the second turbine gas temperature are related (STEP 306) to each other to define a first value. The third turbine gas temperature and the fourth turbine gas temperature are related (STEP 308) to each other to define a second value. The method 300 further includes comparing (STEP 310) the first value and the second value to monitor the engine health.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A method for monitoring engine health of an aircraft having a first engine and a second engine, the method comprising the steps of:
   obtaining a first turbine gas temperature of the first engine and a second turbine gas temperature of the second engine from a first flight;
   relating the first turbine gas temperature and the second turbine gas temperature to each other to define a first value;
   comparing the first value to a data set for monitoring the engine health; and
   sending a communication relating to the engine health from an electronic system to a user interface in response to comparing the first value to the data set,
   wherein the obtaining step includes obtaining the first turbine gas temperature of the first engine and the second turbine gas temperature of the second engine from the first flight at a first set of ambient conditions.

2. The method of claim 1, wherein the first set of ambient conditions includes an ambient temperature, a first rotor speed of the first engine, and a second rotor speed of the second engine.

3. The method of claim 1, wherein the obtaining step includes obtaining the first turbine gas temperature of the first engine and the second turbine gas temperature of the second engine from the first flight at the first set of ambient conditions during take-off of the aircraft from a runway.

4. The method of claim 3, wherein the relating step includes using the first set of ambient conditions to standardize the first turbine gas temperature and the second turbine gas temperature to define a first standardized turbine gas temperature and a second standardized turbine gas temperature, respectively.

5. The method of claim 4, wherein the relating step further includes taking a first difference of the first standardized turbine gas temperature and the second standardized turbine gas temperature to define the first value.

6. The method of claim 5, wherein the data set includes a plurality of values, wherein each value of the plurality of values is defined by taking a difference between a corresponding standardized turbine gas temperature of the first engine and a corresponding standardized turbine gas temperature of the second engine from a previous, independent flight.

7. The method of claim 6, wherein the comparing step includes comparing the first value to the plurality of values of the data set in chronological order of flight.

8. The method of claim 7, wherein the comparing step further includes:
   using at least two of the values of the data set to produce an average; and
   mathematically comparing the first value and the average.

9. The method of claim 8, wherein the average is a moving average.

10. The method of claim 8, wherein the average is a shifted, moving average.

11. The method of claim 10, wherein mathematically comparing includes taking a second difference of the first value and the average to define a first deviation.

12. The method of claim 11, wherein mathematically comparing further includes comparing the first deviation to a threshold value.

13. The method of claim 10, wherein the shifted, moving average has a 7-point moving average and a 2-point shift.

14. A method for monitoring engine health of an aircraft having a first engine and a second engine, the method comprising the steps of:
obtaining a first turbine gas temperature of the first engine and a second turbine gas temperature of the second engine from a first flight;
obtaining a third turbine gas temperature of the first engine and a fourth turbine gas temperature of the second engine from a second flight;
relating the first turbine gas temperature and the second turbine gas temperature to each other to define a first value;
relating the third turbine gas temperature and the fourth turbine gas temperature to each other to define a second value;
comparing the first value and the second value to monitor the engine health, and
sending a communication relating to the engine health from an electronic system to a user interface in response to monitoring the engine health,
wherein obtaining the first turbine gas temperature and the second turbine gas temperature includes obtaining the first turbine gas temperature of the first engine and second turbine gas temperature of the second engine from the first flight at a first set of ambient conditions, and wherein obtaining the third turbine gas temperature and the fourth turbine gas temperature includes obtaining the third turbine gas temperature of the first engine and the fourth turbine gas temperature of the second engine from the second flight at a second set of ambient conditions.

15. The method of claim 14, wherein relating the first turbine gas temperature and the second turbine gas temperature to each other includes using the first set of ambient conditions to standardize the first turbine gas temperature and the second turbine gas temperature to define a first standardized turbine gas temperature and a second standardized turbine gas temperature, respectively, and wherein relating the third turbine gas temperature and the fourth turbine gas temperature to each other includes using the second set of ambient conditions to standardize the third turbine gas temperature and the fourth turbine gas temperature to define a third standardized turbine gas temperature and a fourth standardized turbine gas temperature, respectively.

16. The method of claim 15, wherein relating the first turbine gas temperature and the second turbine gas temperature to each other includes taking a first difference of the first standardized turbine gas temperature and the second standardized turbine gas temperature to define the first value, and wherein relating the third turbine gas temperature and the fourth turbine gas temperature to each other includes taking a second difference of the third standardized turbine gas temperature and the fourth standardized turbine gas temperature to define the second value.

17. The method of claim 16, wherein the comparing step includes statistically analyzing the first value and the second value.

* * * * *